Patented Jan. 8, 1952

2,581,741

UNITED STATES PATENT OFFICE 2,581,741

MODIFIED STARCH PROCESS

Ernest Wulkan, Partille, Sweden

No Drawing. Application December 1, 1948, Serial No. 62,979. In Great Britain December 19, 1947

1 Claim. (Cl. 127—33)

This invention relates to processes for the production of modified starch in which starches or starch-containing raw materials are treated with chemical agents in order to convert their starch content into a so-called "soluble starch" which is soluble in hot or boiling water.

In certain of the known processes the chemical agents employed have included one or other of the following: halogens, substances capable of splitting off oxygen, acids, acid salts, alkalies and other substances. Most of the treatments are carried out at an elevated temperature and the products obtained, when boiled in water, yield solutions the viscosity of which increases considerably when they are cooled and allowed to remain undisturbed for some time. Generally, the solutions gelatinize and this without exception when the chemical agents employed are alkalies.

Solutions prepared in this manner must therefore again be heated, or must be maintained in a heated condition, in order that they may be capable of practical use. This necessarily leads to a reduction in the viscosity of the solutions.

It has, however, been proposed intimately to mix starches or starch-containing raw materials in a dry state with caustic alkalies by grinding them together for several hours, preferably in enclosed mills and the like. The products obtained are, in contrast to those obtained by the present invention, swelling starches which yield a paste in cold water.

The present invention has for its object to provide an improved process for the production of modified starch which shall be distinguished from the known processes in that the product, when dissolved in hot or boiling water, will yield a solution that will remain fluid after cooling, even when allowed to stand undisturbed for a relatively long period of as much as several days, that will not gelatinize and that will not vary in viscosity. By reason of these properties, the solutions will not require heating before being put to practical use so that there will be no question of a reduction in viscosity on this score either.

According to the present invention, a process for the production of a modified soluble starch comprises mixing starch or starch-containing raw material with a relatively small quantity of water that is not more than 20% based on the weight of the starch, and mixing the mass thus obtained with a solid caustic alkali, avoiding grinding, while subjecting the mixture to intensive and extreme cooling as by circulating cold water around the reaction vessel. The mixing operation is preferably effected by stirring in open vessels and the temperature of the reaction mass is maintained at ordinary room temperatures, that is between about 10° to 25° C.

Cooling of the mass is necessary in order to prevent an undue rise in temperature, due to the considerable generation of heat which occurs when the caustic alkali goes into solution in the water which is present, and thus to avoid both the production of a swelling starch such as is obtained by the already known processes and undesirable discoloration of the product.

The process according to the invention will proceed to completion more readily and more quickly if the starch, or the water to be employed for mixing therewith, has initially added thereto a substance which will split off oxygen.

Alternatively, in order to produce the same result, the water to be employed for mixing with the starch may have admixed therewith an aliphatic aldehyde or ketone.

According to the purpose for which it is required, the alkaline starch obtained by the process according to the invention may be wholly or partially neutralized with the aid of solid or gaseous acids or acid salts. It may even be made acid in some cases. Thus products of very different applicability in practice may be obtained.

All the products produced by the foregoing processes are dry and do not require any separate drying operation. These products are insoluble and do not swell in cold water but they are fully soluble in hot water and yield solutions which are stable with respect to fluidity, freedom from gelatinization and change in viscosity, for a period of at least eight days. The products themselves are dry, gritty powders.

The manner in which the invention is to be carried into effect will be clearly understood from the examples given below:

Example 1

100 kg. of maize starch are mixed with 12 kg. of water and are then mixed with 15 kg. of caustic soda in an open container which is intensively cooled with water. The process takes about 15 minutes for completion, whereupon neutralisation to a pH value of 8 is effected with the appropriate quantity of tartaric acid. If 30 g. of this mixture are boiled in 1 litre of water, allowed to cool and left standing for eight days, the solution obtained does not gelatinize and its viscosity remains the same as it was immediately after cooling.

Example 2

100 kg. of tapioca starch are mixed with 20 kg.

of water and 2 kg. of sodium perborate and then treated as above with caustic soda.

The product obtained is neutralised to a pH value of 7 with gaseous hydrogen chloride. 50 g. of this product boiled in 1 litre of water yield a solution which, upon cooling, will not gelatinize even after standing for 8 days, the viscosity remaining the same as it was immediately after cooling.

*Example 3*

100 kg. of potato starch are mixed with 18 kg. of water to which has previously been added 3 kg. of butyraldehyde ($C_3H_7 \cdot COH$) and then treated as in Example 1. Neutralisation is effected with sufficient sodium bisulphite to produce a pH value of 6. A solution produced by boiling 80 g. of the product in one litre of water, when allowed to cool, will not gelatinize even after 8 days, its viscosity remaining substantially unaltered.

As indicated in the foregoing examples, the amount of water that can be added to the dry starch may be varied within rather narrow limits. Generally speaking, from 10% to 20% by weight of the starch is the range of water addition that is contemplated in this process.

What I claim is:

A process for the production of a modified soluble starch which comprises subdividing solid starch into small particles, adding not more than 20% by weight of water to said starch particles, intimately mixing the water and particles together, adding about 15% by weight of comminuted caustic alkali to the mixture, and intimately mixing the several ingredients without further comminuting them for a period of about fifteen minutes under intense water cooling to yield a powdered mass.

ERNEST WULKAN.

REFERENCES CITED

The following references are of record in the file of this patent:

UNITED STATES PATENTS

| Number | Name | Date |
|---|---|---|
| 376,445 | Marsden | Jan. 17, 1888 |
| 941,159 | Militz | Nov. 23, 1909 |
| 1,020,656 | Perkins | Mar. 19, 1912 |
| 1,474,129 | Weiss | Nov. 13, 1923 |
| 1,773,056 | Meyer | Aug. 12, 1930 |
| 1,947,295 | Jozsa | Feb. 13, 1934 |
| 2,314,459 | Salzburg | Mar. 23, 1943 |

OTHER REFERENCES

Radley, "Starch and Its Derivatives," 3rd ed., N. Y., 1944, pages 264–268.